United States Patent [19]
Doe et al.

[11] 3,941,256
[45] Mar. 2, 1976

[54] BAR FEEDERS
[75] Inventors: Ewart H. Doe, Stockbridge; William J. Linforth, Chandlers Ford, both of England
[73] Assignee: Twyford Moors (Aircraft & Engineering Limited), Eastleigh, England
[22] Filed: July 12, 1974
[21] Appl. No.: 487,953

[30] Foreign Application Priority Data
Aug. 21, 1973 United Kingdom............... 39498/73

[52] U.S. Cl...................... 214/1.4; 29/37 R; 82/2.7; 279/41 A; 279/75
[51] Int. Cl.² ......................................... B65H 51/26
[58] Field of Search .......... 214/1.1, 1.4; 82/2.5, 2.7; 29/37 R; 279/75, 41 A

[56] References Cited
UNITED STATES PATENTS

| | | | |
|---|---|---|---|
| 1,516,146 | 11/1924 | Buckingham | 82/2.5 |
| 3,019,027 | 1/1962 | Klein | 279/75 X |
| 3,262,583 | 7/1966 | Thevenet | 214/1.1 |
| 3,827,581 | 8/1974 | Inui | 214/1.4 X |

*Primary Examiner*—Robert J. Spar
*Assistant Examiner*—Abraham, George F.
*Attorney, Agent, or Firm*—Neil F. Markva

[57] ABSTRACT

A bar holder and feeder for an automatic machine tool comprising an elongated bar holder aligned with the machine tool, which bar holder can be opened to allow bar to be loaded thereinto; loading means to load bar into a loaded position in the bar holder; and a bar feeder positioned between the elongated bar holder and the machine tool, through an open collet of which machine tool bar is to be fed from the bar holder, the bar feeder comprising a sleeve engageable over a bar to be fed at a position externally of the machine tool and feed means to cause axial movement of the sleeve, the sleeve having internal biased gripping means which permit the sleeve to be moved by the feed means over the bar in a direction away from the machine tool but prevent the sleeve being moved by the feed means over the bar in a direction towards the machine tool, whereby a reciprocation of the sleeve by the feed means causes the bar to be fed to the machine tool, and means to prevent movement of the bar from the loaded position in a direction away from the machine tool to enable the sleeve initially to be pressed over the end of the bar nearer the machine tool or means to move the bar towards the machine tool initially to engage the end of the bar nearer the machine tool in the sleeve.

The loading means may include a pair of jaws which can grip the bar in the loaded position and prevent movement of the bar away from the machine tool. The feed means may comprise a slide, with which the sleeve can be entrained, movable towards and away from the machine tool by a suspended weight and/or piston/cylinder arrangement.

18 Claims, 15 Drawing Figures

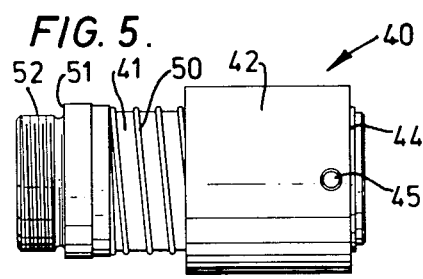
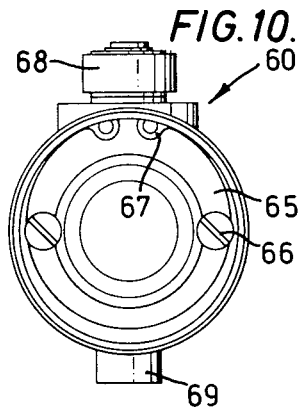
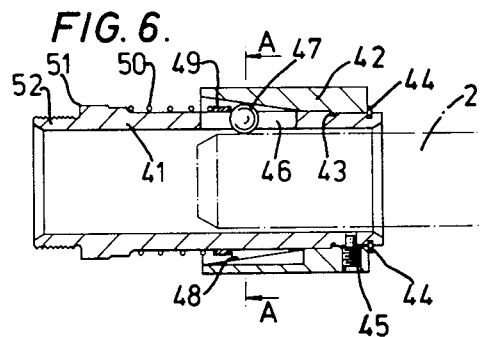
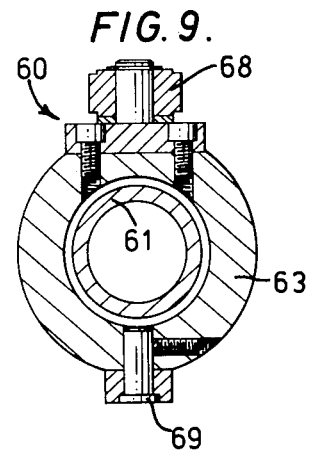
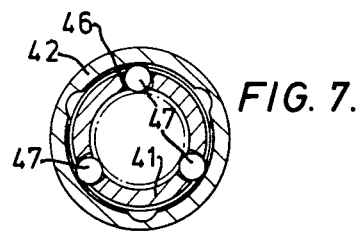
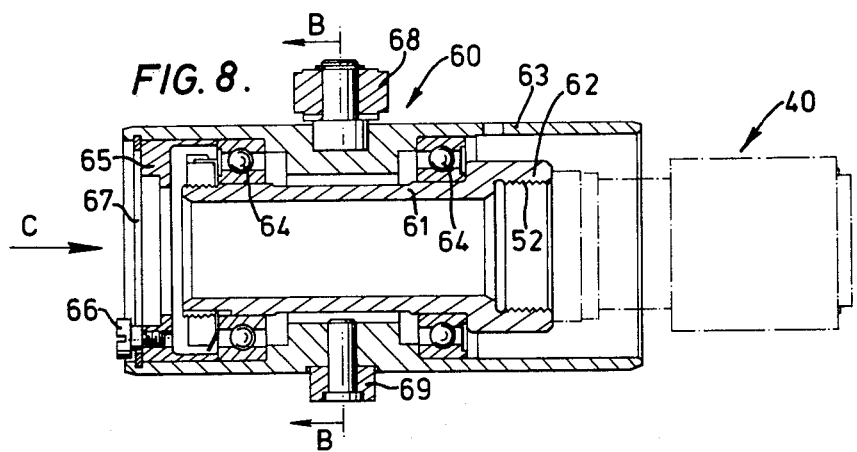

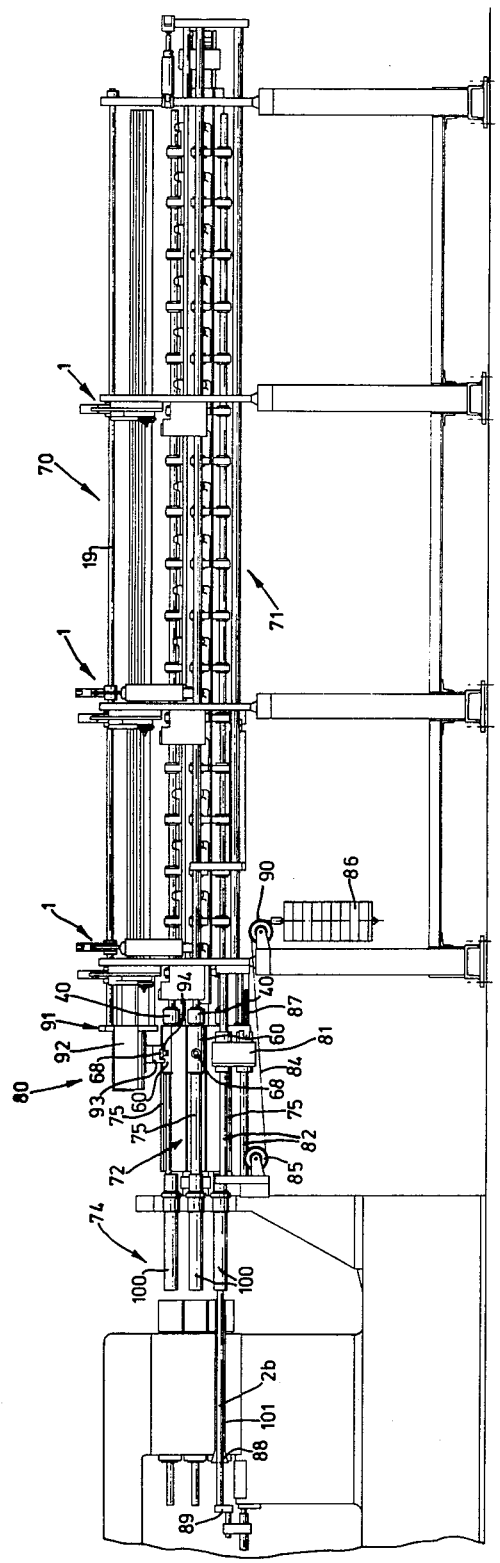

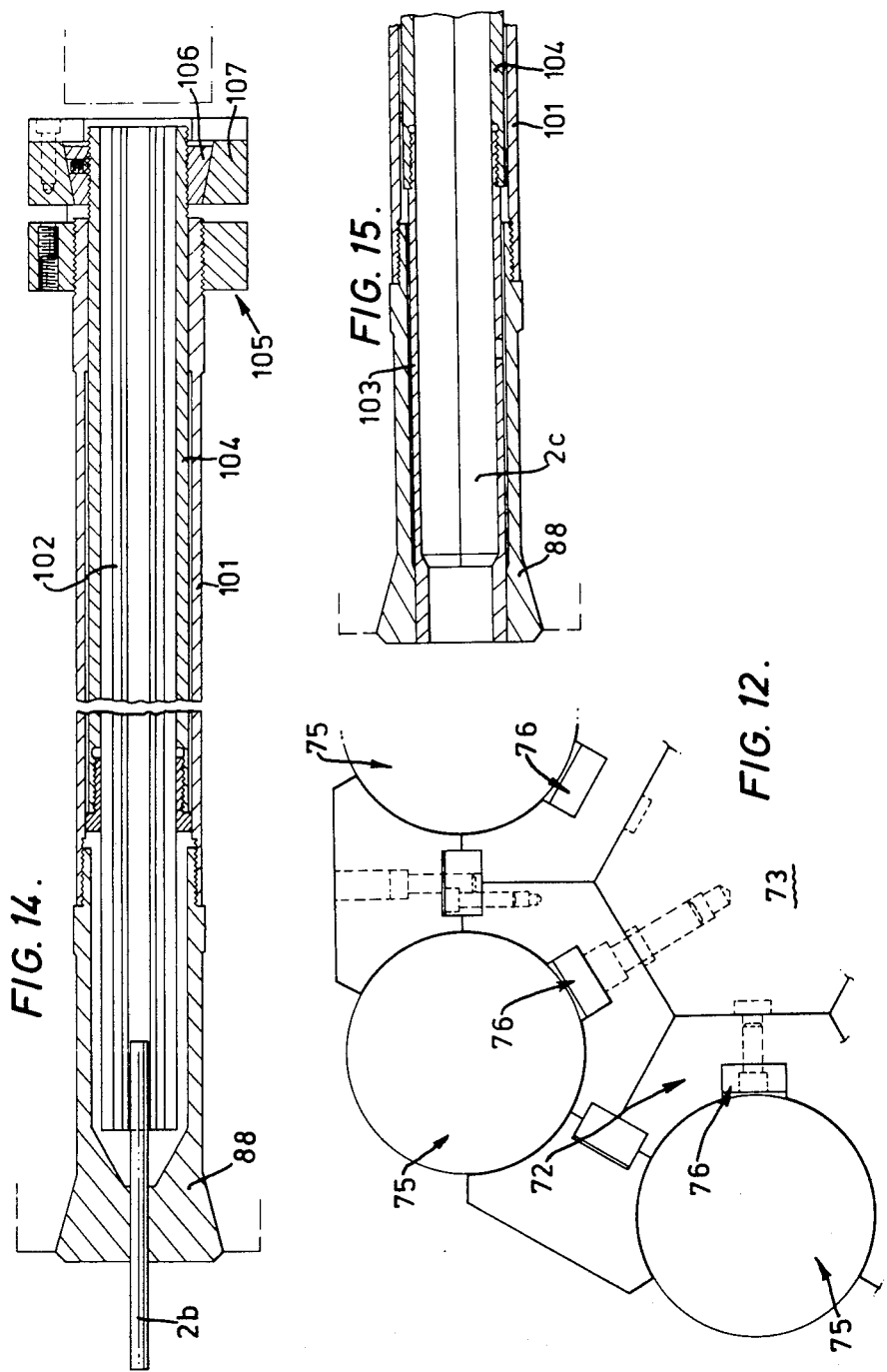

BAR FEEDERS

BACKGROUND OF THE INVENTION

The invention relates to bar holders and feeders for machine tools.

Our U.S.A. patent application Ser. No. 187,985, now U.S. Pat. No. 3,802,689, discloses a bar holder to hold bar stock material to be fed to a machine tool and our U.S.A. patent application Ser. No. 164,403, now U.S. Pat. No. 3,782,593, discloses loading means for loading bar stock material into such bar holders. Such loading means merely allows a bar to fall under gravity into the bar holder to lie in a position such that it will be contained in the bar holder when the bar holder is subsequently closed.

Various means have been proposed for feeding bar from bar holders through the collets of machine tools but generally such means are too slow for optimum operation and/or are not capable of feeding bar of non-round section, for example hexagonal or square section bar.

SUMMARY OF THE INVENTION

According to the invention there is provided a bar holder and feeder for an automatic machine tool comprising an elongated bar holder aligned with the machine tool, which bar holder can be opened to allow bar to be loaded thereinto; loading means to load bar into a loaded position in the bar holder; and a bar feeder positioned between the elongated bar holder and the machine tool, through an open collet of which machine tool bar is to be fed from the bar holder, the bar feeder comprising a sleeve engageable over a bar to be fed at a position externally of the machine tool and feed means to cause axial movement of the sleeve, the sleeve having internal biased gripping means which permit the sleeve to be moved by the feed means over the bar in a direction away from the machine tool but prevent the sleeve being moved by the feed means over the bar in a direction towards the machine tool, whereby a reciprocation of the sleeve by the feed means causes the bar to be fed to the machine tool, and means to prevent movement of the bar from the loaded position in a direction away from the machine tool to enable the sleeve initially to be pressed over the end of the bar nearer the machine tool or means to move the bar towards the machine tool initially to engage the end of the bar nearer the machine tool in the sleeve.

The elongated bar holder may be provided as one of a plurality of bar holders provided in an indexable reel and adapted to hold bar to be fed by the feeder means to a respective spindle of an automatic multi-spindle machine tool such as a lathe.

Preferably the loading means comprise a pair of opposed jaws between which the bar can be engaged and means to move the jaws to locate the bar in said loaded position in the bar holder. Said means to prevent movement of the bar advantageously comprises means to cause the pair of opposed jaws of the loading means to grip the bar in the loaded position. The pair of jaws are preferably both mounted on a slide, the slide being reciprocable towards the bar holder from a position at which bar to be loaded can roll from a store of bars into a position of engagement between the jaws and a position at which the bar is located in said loaded position and is gripped by the jaws. The jaws can be caused to grip the bar by a stop engaged by one of said jaws, which said one of said jaws leads during movement of the slide towards the bar holder, as said slide moves into said position at which the bar is located in the loaded position.

Said one of said jaws is preferably pivotably mounted on said slide for pivoting movement about an axis extending parallel to the plane of movement of the bar into the loaded position, to permit said one of said jaws to be released from under the bar upon movement of the slide away from the loaded position, means being provided to prevent pivotal movement of said one of said jaws during movement of the slide towards the loaded position and means being provided to cause pivotal movement of said one of said jaws as the slide moves into its retracted position to position said one of said jaws for engagement of a further bar between said jaws.

Thus the loading means can hold the bar against axial movement while the sleeve of the bar feeder is engaged on the end of the bar nearer to the machine tool.

The loading means is preferably adjustable according to the size of bar being loaded, can load bar of cylindrical or other section, such as hexagonal, and moves the bar to a position at which it is coaxial with the bar holder when the bar holder is closed.

Preferably the sleeve comprises an inner sleeve and an outer sleeve secured together against relative movement and said internal abiased gripped means comprise captive balls engaged in longitudinally extending slots in the inner sleeve, an inner surface of the outer sleeve comprising a ramp face or faces overlying said slots, and a compression spring or springs biasing to press the balls in a direction away from the machine tool and against the ramp face or faces of the inner surface of the outer sleeve and thereby radially inwardly of the inner sleeve through the slots to engage the surface of a bar extending through the inner sleeve. Preferably the spring acts on the balls through the intermediary of a collar slidable along the inner sleeve.

Advantageously the feed means to cause axial movement of the sleeve comprises a slide reciprocable in a direction parallel to the elongated bar holder, a mounting member for the sleeve, guide means for the mounting member and coupling means to couple the mounting member to the slide whereby the mounting member is entrained for movement with the slide.

The mounting member may comprise an inner mounting sleeve securable to said sleeve, an outer mounting sleeve, bearings between the inner mounting sleeve and the outer mounting sleeve to permit relative rotation, a radially extending projection from the outer mounting sleeve to engage in a longitudinally extending slot in the guide means for the mounting member to prevent rotation of the outer mounting sleeve and a further radially extending projection from said outer mounting sleeve to engage in a groove in said slide, said further radially extending projection and said groove comprising said coupling means.

The slide may be reciprocable by means of a chain, wire or cord or like means coupled to the slide and extending over a sprocket or pulley to a suspended weight and effective to move the slide parallel to the bar holder, preferably under the control of fluid damping means, a double-acting pneumatic or hydraulic cylinder, a cam arrangement, an electric motor with slipping clutch or a linear motor.

The bar feed means can have the advantage over previously proposed bar feed means that when in a machine tool having a plurality of spindles in a spindle drum, a force tending to feed bar through a collet of a spindle can be applied to the bar before the spindle drum has been fully indexed into the position where feed of bar is required whereby the necessary "open" time of the collet of the spindle to permit bar feed at the indexed position for bar feed can be reduced compared with an arrangement in which force to feed the bar through the collet cannot be applied to the bar until the spindle drum has fully indexed into the position at which bar feed is required.

Preferably the bar feeder includes a bar sensor device having a further slide including a groove engageable with the further projection of the outer mounting sleeve and means to move said further slide in a direction parallel to the elongated bar holder to locate the sleeve at a position forward of the position at which the forward end of a bar will be located in said loaded position and to move the sleeve back over the forward end of the bar after the bar has been moved by the loading means into said loaded position and while it is still gripped by the jaws of the loading means. Means coupling said means to move said further slide to means to cause reciprocation of the slide of the loading means are preferably provided whereby if, due to the position of the rear end of a previously fed bar, said means to move said further slide is unable to move said further slide sufficiently to locate said sleeve forward of the position at which the forward end of a bar will be located in said loaded position, said means to cause reciprocation of the slide of said loading means is prevented from operating.

The machine tool preferably has, for each spindle, a sub-collet having a circular outside configuration and an internal configuration to suit the section of bar to be machined, and a slipping clutch arrangement to cause relative rotation of the bar being fed by the bar feeder and the sub-collet to align the bar with the internal configuration of the sub-collet and permit passage of the bar through the sub-collet.

BRIEF DESCRIPTION OF DRAWINGS

The invention is diagrammatically illustrated by way of example in the accompanying drawings, in which:

FIG. 5 is an elevation of a feed sleeve of a bar holder and feeder according to the invention;

FIG. 6 is a sectional view corresponding to FIG. 5;

FIG. 7 is a sectional view taken on line A—A of FIG. 6;

FIG. 8 is a sectional view through a mounting for a feed sleeve according to FIGS. 5, 6 and 7;

FIG. 9 is a sectional view on line B—B of FIG. 8;

FIG. 10 is a view taken in the direction of arrow C of FIG. 8;

FIG. 11 is a side view of a bar holder and feeder according to the invention feeding bar to a multiple spindle machine tool;

FIG. 12 is an end view of a guide block for the bar feeder of FIG. 11;

FIG. 14 is a sectional view through a guide tube through which a bar can be fed by the bar feeder; and FIG. 15 shows a sub-collet arrangement for use with non-round section bar.

DESCRIPTION OF SPECIFIC EMBODIMENTS

Figure 1:
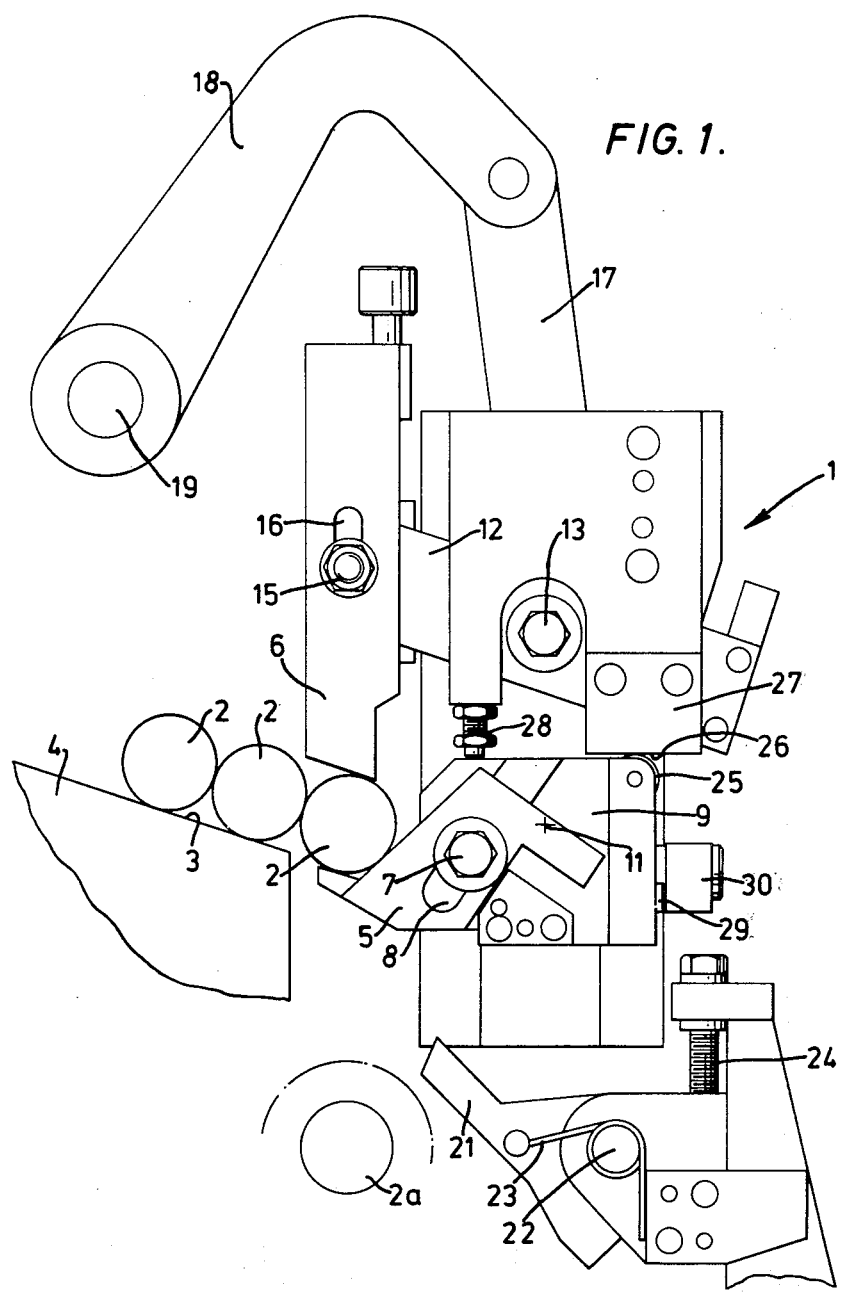
FIG. 1 is an elevation of bar loading means of bar holder and feeder according to the invention, in an initial position.

Referring to FIGS. 1 to 4, bar loading means generally indicated at 1, for a bar holder and feeder, is to load bars 2 one at a time into elongated bar holders, which bar holders are not shown in the drawings but are preferably of the kind described in our U.S.A. patent application Ser. No. 187,985, now U.S. Pat. No. 3,802,689 and a plurality of which are provided in a rotatably indexable reel, the bar loading means 1 being required to move the bars 2 to a position shown at 2a in FIGS. 1 and 4, at which position they will be aligned with the bar holder for the time being positioned below the loading means, so that the bar holder can close thereover to hold the bar.

The bars 2 to be loaded lie on the inclined upper face 3 of a frame member 4 of a bar holder frame which mounts the reel and the lowermost one of the bars 2 lies in an adjustable lower jaw member 5 and has an upper jaw member 6 located over its upper face. The lower jaw 5 is adjustable mounted by means of an adjusting bolt 7 and slotted hole 8 on a mounting block 9 and the mounting block 9 is pivotably mounted on a slide 10 for pivotable movement about a horizontal axis 11. A mounting arm 12 for the upper jaw 6 is adjustably mounted on the slide 10 by means of a bolt 13 and slotted hole 14 and the upper jaw 6 is adjustably mounted on the arm 12 by means of a bolt 15 and slotted hole 16. The upper end of the slide 10 is connected through a link 17 to an arm 18, the arm 18 being secured against rotation on a shaft 19 which can be rotated by means of an air-cylinder (not shown) and which couples together for synchronized movement three of the bar loading means 1 spaced along the bar holder frame. Partial rotation of the shaft 19 causes, through the arm 18 and link 17, the slide 10 move between the upper position shown in FIG. 1 at which the jaws 5 and 6 can receive therebetween a length of bar 2 to be loaded and a lower position shown in FIGS. 3 and 4 wherein the bar 2 is held between the jaws 5 and 6 in the correct position to be received by a bar holder of the reel when the bar holder is closed. The bottom position to which the slide 10 and thus the jaws 5 and 6 can move is determined by a stop 21 pivotally mounted about an axis 22 and spring-biased by a spring 23 to the upward position shown in FIG. 1 the stop 21 being abutted by the bolt 7 during downward movement of the slide 10 to move the stop 21 from the position of FIG. 1 to the position of FIG. 3. The stop 21 is mounted on the frame of the bar holder and is adjustable by means of a bolt 24.

Figure 2:
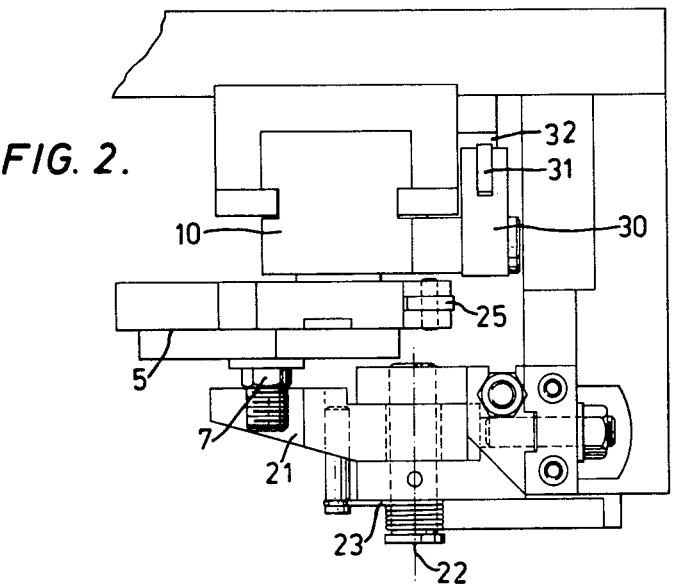
FIG. 2 is a plan view corresponding to FIG. 1.
Figure 3:
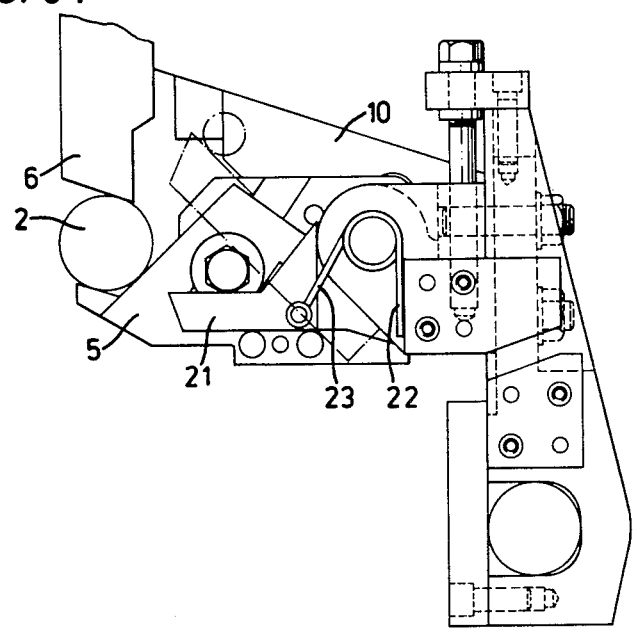
FIG. 3 is a view corresponding to the lowest part of FIG. 1 but with the bar loading means shown in a loading position.
Figure 4:
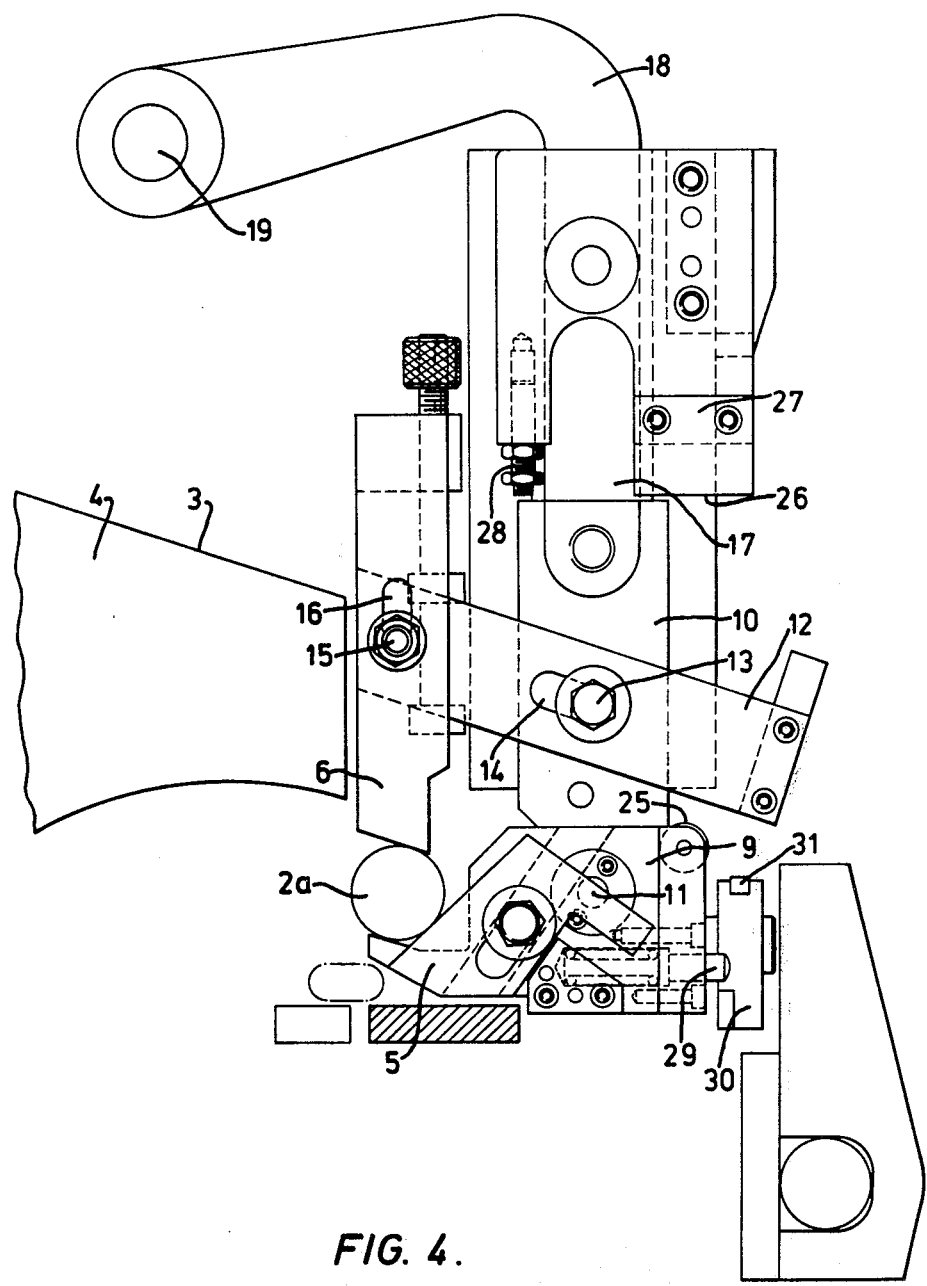
FIG. 4 shows the bar loading means of FIG. 1 in a position corresponding to FIG. 3 but with parts removed to show details of construction.

The lower jaw 5 and mounting block 9 are freely movable about the axis 11 and can move from the position shown in the drawings approximately 45° in anti-clockwise rotation. When the slide 10 is moved upwardly and approaches its upper position, a roller 25 on the mounting block 9 abuts a face 26 of a fixed plate 27 and rotates the mounting block 9 clockwise about the axis 11 until an upper face of the mounting block 9 abuts a stop screw 28. A plunger pin 29 is slidably mounted in the block 9 and pressed outwardly therefrom by an internal spring. The outer end of the plunger pin 29 co-operates with a pivotable stop 30 mounted on the slide 10 and having as shown in FIG. 2, a roller 31 which co-operates with a fixed cam track 32. The pivotable stop 30 in the upper position of the slide 10 and during downward movement of the slide 10 is abutted by the plunger pin 29 and prevents the mounting block pivoting in an anti-clockwise direction about the axis 11, the spring of the plunger pin 29 thereby pressing the lower jaw 5 upwardly against the bar 2.

In operation, when a bar 2 has rolled between the jaws 5 and 6 and loading of a bar into a bar holder is desired, the shaft 19 is rotated to move the slide 10 downwardly. As the mounting block 9 moves away from the stop screw 28, the mounting block 9 is pivoted slightly in a clockwise direction about its pivot 11 by the spring of the plunger pin 29 and the lower jaw 5 presses the bar 2 against the upper jaw 6. The bar 2 is carried downwardly held between the jaws 5 and 6, the bolt 7 strikes the stop 21 and caries it to its lower position shown in FIG. 3 and the slide 10 is stopped with the bar held at the desired position 2a. After the bar holder has closed and when it is desired to move the slide 10 upwardly, the roller 31 of the pivotable stop 30 co-operates with the cam track 32 to rotate the pivotable stop 30 out of abutment with the plunger pin 29 thereby allowing the mounting block 9 to pivot anti-clockwise about the axis 11 so that the lower jaw 5 can move out from underneath the bar held in the position 2a. The slide 10 continues upwardly and before it reaches its uppermost position the roller 25 strikes the surface 26 of the plate 27 to rotate the mounting block 9 and lower jaw 5 clockwise to restore them to the position at which the loading sequence can be repeated. The bottom stop 21 is spring-biased by the spring 23 about its axis 22 so that when the slide 10 is not in its lowermost position, the stop 21 is cocked clear of the reel mounting the bar holders.

The spring loaded plunger pin 29 is not essential and can be omitted if desired, and the pivotable stop 30, roller 31 and camtrack 32 replaced by a simple trip arm and stop screws. The trip arm prevents the mounting block 9 and lower jaw 5 rotating anti-clockwise about the axis 11 during downward movement of the slide 10 and is tripped out of position by a stop screw as the slide 10 approaches its lowermost position. If the spring loaded plunger pin 29 is omitted, the bar 2 is not gripped between the jaws 5 and 6 but is merely located therebetween during downward movement of the slide 10. The adjacent vetical face of the frame member 4, or an adjustable plate mounted thereon, stops the bar 2 from moving out from between the jaws during such downward movement. As the slide 10 approaches its lowest position the jaw 5 is forced upwardly, by abutment of the bolt 7 and the bottom stop 21, to grip the bar. The spring 23 can also be omitted if desired and replaced by a slotted lost-motion coupling link coupling the slide 10 to the bottom stop 21 so that the stop 21 is raised clear of the bar holder reel as the slide 10 moves into its uppermost position.

The plate 27 can be hingably mounted so that it can be hinged out of the path of the roller 25 to free the lower jaw 5 and allow a length of bar located between the jaws 5 and 6 to be manually removed.

The bar loader 1 is capable of feeding not only cylindrical bar, as shown, but hexagon or other section bar.

Referring to FIGS. 5, 6 and 7, a feeder sleeve generally indicated at 40 has an inner sleeve 41 and an outer sleeve 42, the forward end of a length of bar 2 to be fed being shown received within the inner sleeve 41. The outer sleeve 42 is locked on the inner sleeve 41 against relative axial movement by means of a shoulder 43 and a circlip 44 and against relative rotation by means of a grub screw 45. Three slots 46 are provided in the inner sleeve 41 and receive steel balls 47 in a manner to allow the balls to move longitudinally in the slots 46 but to prevent them falling into the bore of the inner sleeve 41. The inner face of the outer sleeve 42 adjacent the slots 46 in the inner sleeve 41 is frusto-conical to give a ramp face 48 against which the outer faces of the balls 47 bear. A collar 49 is slidable on the outside of the inner sleeve 41 and is biased by compression spring 50 to press the balls 47 against the ramp face 48.

At the lefthand end, as viewed in FIGS. 5 and 6, the inner sleeve 41 presents a shoulder 51 and has a screwthread 52 its extreme outer end.

The mounting of the balls 47 and their co-operation with the spring 50 and ramp face 48 is such that the feeder sleeve 40 can be moved rightwardly, as viewed in FIGS. 5 and 6, over the length of bar 2 with the balls 47 sliding or rolling thereover but cannot be moved leftwardly, as viewed in FIGS. 5 and 6, with respect to the bar 2 so that if it is moved leftwardly then it entrains the bar 2 for movement therewith, thereby to feed the bar forward. Different sizes of feeder sleeve are required for different bar sizes but by careful selection of the length and angle of the conical ramp face 48 each feeder sleeve 40 can be used for a variety of fairly closely spaced bar sizes.

Referring to FIGS. 8, 9 and 10, a feeder sleeve mounting, generally indicated at 60, has an inner sleeve 61 with an internal screwthread 62, at one end, the righthand end as shown in FIG. 8, to receive the external screwthread 52 of one of the feeder sleeves 40 whereby the feeder sleeve 40 and feeder sleeve mounting 60 can be locked together. The inner sleeve 61 is mounted in an outer sleeve 63 by means of ball bearing races 64 and is retained therein by means of an end plate 65 and a circlip 67. Screws 66 are engaged in the end plate 65 to secure guide tubes described hereinafter. A roller follower 68 is mounted at one side of the outer sleeve 63 and a roller 69 is mounted at the other side of the outer sleeve 63.

FIG. 11 shows a bar holder, generally indicated at 70, provided with three of the bar loading means 1 of FIGS. 1 to 4. The bar holder 70 shown has a reel 71 rotatably mounted in the frame of the bar holder, the reel 71 having six elongated bar holders. At the forward end of the bar holder, the lefthand end as viewed in FIG. 11, a bar feeder 80 is mounted comprising six of the feeder sleeves 40 each secured on a respective feeder sleeve mounting 60 and each aligned with one of the bar holders of the bar holder reel 71. The roller follower 68 of each feeder sleeve mounting 60 extends radially outwardly therefrom.

Referring to FIG. 12, a guideway block 72 of the bar feeder 80 is mounted on a hexagonal shaft 73 which extends from a machine tool 74, shown in FIG. 11, through the guideway block 72 is coupled to the reel 71 whereby when the spindle drum of the machine tool 74 is rotatably indexed, the guideway block 72 and the reel 71 of the bar holder 70 are carried round therewith. The guideway block 72 has six guideways 75, only two of which are fully shown in FIG. 12. Each guideway 75 has at an inner portion thereof a groove 76 to receive the roller 69 of a respective feeder sleeve mounting 60 whereby the roller follower 68 of each feeder sleeve mounting 60 projects radially outwardly from the respective guideway 75. To simplify machining of the guideway block 72, the outer sleeve 63 of the feeder sleeve mounting 60 can be hexagonal and the guideways 75 of the guideway block 72 of corresponding shape.

Figure 13:
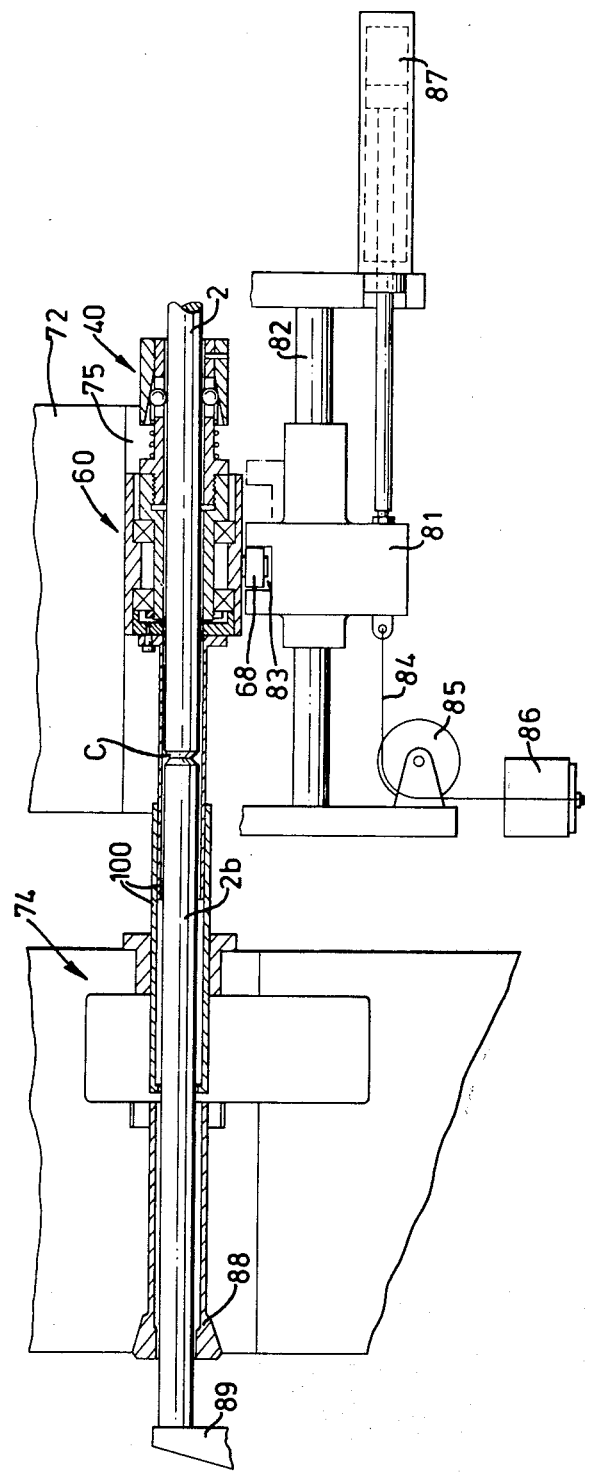
FIG. 13 shows further details of the bar feeder.

Referring to FIG. 13, adjacent the position of the spindle drum at which bar feed with a desired in operation of the machine tool 74, a slide 81 is provided mounted on two longitudinally extending rails 82. The slide 81 has a groove 83 therein to receive the roller follower 68 of one of the feeder sleeve mountings 60 which is shown mounting one of the feeder sleeves 40. As the guideway block 72 is indexed round with the spindle drum of the machine, the roller follower 68 of the feeder sleeve mountings 60 will be successively brought into engagement with the groove 83 of the slide 81. The slide 81 is biased for movement leftwardly as shown in FIG. 14, that is to say towards the machine tool 74 by means of a wire or chain 84 which passes over a pulley or sprocket 85 and is coupled to a weight 86. Movement of the slide 81 along the rails 82 under the force of the weight 86 is controlled by a piston/cylinder arrangement 87. As soon as the roller follower 68 of a feeder sleeve mounting 60 is engaged in the groove 83 of the slide 81, and this can occur, with a suitable length of groove 83, well before the feeder sleeve mounting 60 is indexed to the position at which feed is required, the piston/cylinder 87 is vented so that the force of the weight 86 acts upon the slide 81 and through the feeder sleeve mounting 60 and feeder sleeve 40 acts on a length of bar 2 engaged in the feeder sleeve 40. As shown in FIG. 13, the forward end of the bar 2 held in the feeder sleeve 40 is butted at C against the rear end of a length of bar 2b, the front end of which length of bar 2b extends through a collet 88 of the machine tool 74. Thus, as soon as the collet 88 opens to allow bar feed, the force of the weight 86 drives the bar 2b therethrough to abut a dead stop 89 and there is therefore no delay between opening of the collet 88 and feed of bar therethrough. Feed of bar can even be effected before the spindle drum has fully indexed into position. After bar feed to the dead stop 89 has been effected and any desired movement of the dead stop towards the collet 88 has occurred, the collet 88 is closed and the piston/cylinder 87 energized to move the feeder sleeve mounting 60 and feeder sleeve 40 back to their initial positions, the feeder sleeve 40 sliding over the bar 2, and to raise the weight 86.

The arrangement shown in FIG. 11 is modified to include a further pulley or sprocket 90 whereby the weight 86 is removed from the immediate area of the bar feeder 80. If desired, the weight 86 can be omitted and the piston/cylinder 87 used for both the forward and the retraction movements.

Referring to FIGS. 1 and 11, the bars 2 are stored on the face 3 of the bar holder with their front ends at a position indicated by the arrow 91 in FIG. 11. This is a position which is forward of the feeder sleeves 40 when they are in their retracted positions. A bar sensor unit 92 is provided for the feeder 80 and includes a slide 93 having a groove 94 therein to engage the roller follower 68 of the feeder sleeve mounting 60 which is uppermost, that is to say is aligned with a bar holder of the reel 71 which is in a position to receive bar from the bar loading means 1. When the sensor 92 senses that the bar in the bar holder which it is sensing has been used up, it moves the slide 93 forwardly by means of an air ram to carry the feeder sleeve 40 with which it is engaged forwardly beyond the position 91. The bar holder is then opened and the bar loading means 1 operated to load a bar into the bar holder. The jaws 5 and 6 of the bar loading means 1 hold the bar against axial movement while the air ram of the sensor 92 moves the feeder sleeve 40 rearwardly to engage the front end of the new bar therein. As soon as the feeder sleeve 40 has returned to its retracted position and is engaged over the front end of the new bar, the slide 10 of the loading means 1 can be raised to remove the jaws 5 and 6 of the bar loading means 1 from the bar.

If the rear end of the bar 2b is so closely adjacent the position 91 that the air ram cannot move the slide 93 forwardly, since the feeder sleeve 40 cannot be moved forwardly over the old bar 2b, the sensor unit signals the air ram of the bar loading means 1 not to effect a bar loading operation. Indexing of the reel is then continued and a bar loading attempted next time around.

The bar holder described in our U.S.A. patent application Ser. No. 187,985, now U.S. Pat. No. 3,802,689, can be closed while the jaws 5 and 6 still hold the bar 2.

During operation of the machine tool 74, the collets 88 thereof are driven for rotation and the feeder sleeve 40 gripping each bar spins therewith as does the inner sleeve 61 of the feeder sleeve mounting 60 but, due to the provision of the ball bearings 64, the outer sleeve 63 of the feeder sleeve mounting 60 does not spin.

If desired, other means may be used to engage the front end of a new bar 2 into the feeder sleeve 40 than the means described above. Thus, the normal retracted positions of the feeder sleeves 40 could be forward of the position 91 and feed rolls to engage a front part of the bar in the bar holder 70 or other means could be used to propell a new bar forwardly to engage it into its respective feeder sleeve 40.

Once the bar is engaged in its feeder sleeve 40 it is propelled forwardly when desired by the force of the weight 86 acting on the slide 81, the slide 81 subsequently being returned to its retracted position and the weight 86 lifted ready for a further feed sequence by energization of the piston/cylinder arrangement 87. The piston/cylinder arrangement 87 may if desired be provided with a limited bleed arrangement whereby the forward speed of the bar 2 under the force of the weight 86 can be controlled. A cushion spring (not shown) is advantageously provided where the chain or wire 84 is connected to the slide 81. The length of travel of the slide 81 on the bars 82 is preferably at least equal to the maximum length of workpiece which the machine tool 74 is capable of machining whereby in a single forward feed movement, up to the maximum length of workpiece which can be machined can be supplied.

Where, as may be the case, there is a gap between the rear end of an old bar 2b and the front end of a new bar 2, this can be sensed by sensing means in the bar feeder 80 and venting of the piston/cylinder arrangement 87 can be prevented the next time feed from that bar holder is required, whereby the bar 2b is not fed forward when the collet 88 opens but when the collet 88 closes again, the piston/cylinder arrangement 87 is vented to cause the slide 81 to feed forward and close up the gap between the bars 2b and 2. This may well be necessary where the desired workpiece length is greater than half the feed length. If this does occur, the machine tool 74 merely carries out its operation without a workpiece since bar to form a new workpiece has not been fed forward.

If the operating sequence of the machine tool 74 is such that a machining operation is effected at the indexed position at which bar feed is effected, before bar feed is effected, then a double bar feed may be effected by two operations of the piston/cylinder arrangement 87 and slide 81 so that the gap is closed up while the machining is being effected and when the collet opens, bar to form a fresh workpiece can be pushed therethrough.

Telescopic guide tubes 100 (FIG. 11) may be provided between the bar feeder 80 and the machine tool 74, the telescopic guide tubes 100 being of a diameter to suit the bar diameter being machined or provided with a coiled spring liner with an inside diameter less than twice the outside diameter of the bar to be machined, thereby to prevent the bar 2 from overlapping the rear end of the forward bar 2b.

Each of the telescopic guide tubes 100 is secured to the front of a respective one of the feeder sleeve mountings 60 by means of the screws 66 thereof.

Collet extension tubes 101 couple each collet 88 to its respective operating means.

Spindle liner tubes 102 may be provided to reduce the effective bore of the spindles of the machine tool 74 at the rear of the collets 88, when small diameter bar is to be machined, as shown in FIG. 14, or may be provided with coiled spring liners in similar manner to the guide tubes 100.

Where it is desired to feed non-round section bar, for example hexagon or square section bar 2c, a sub-collet 103 (FIG. 15) may be provided with a bore of the required section to take the non-round section bar to be machined and may be provided at its outside of circular section whereby it can be gripped in the machine collet 88 which is of standard bore but oversized. The sub-collet 103 is screwed to the forward end of a tube 104 and, as shown in FIG. 14, the tubes 101 and 104, and thereby the collet 88 and sub-collet 103 are coupled through a cone-clutch arrangement indicated generally at 105. When the sub-collet 103 is pushed forwardly due to bar feed, clutch members 106, 107 connected respectively to the tubes 104, 101 are brought into engagement so that the clutch member 106 and sub-collet 103, which stop rotating when the collet 88 opens, are jogged round by the still rotating collet 88, tube 101 and clutch member 107, so that the non-round section bar pushed forwardly by the weight 86 can pass through the sub-collet 103 when the non-round section bore of the sub-collet 103 becomes aligned with the non-round section of the bar.

What is claimed is:

1. A bar holder and feeder for an automatic machine tool comprising:
    a. an elongated bar holder aligned with the machine tool, which bar holder can be opened to allow bar to be loaded thereinto;
    b. loading means comprising a pair of opposed jaws between which jaws the bar can be engaged and means to move said jaws to locate the bar in a loaded position in said bar holder; and
    c. a bar feeder positioned between the elongated bar holder and the machine tool, through an open collet of which machine tool bar is to be fed from the bar holder,
    d. the bar feeder comprising a sleeve engageable over a bar to be fed at a position externally of the machine tool and feed means to cause axial movement of said sleeve,
    e. said sleeve having internal biased gripping means which permit said sleeve to be moved by said feed means over the bar in a direction away from said machine tool but prevent said sleeve being moved by said feed means over the bar in a direction towards said machine tool, whereby a reciprocation of said sleeve by said feed means causes the bar to be fed to said machine tool,
    f. means to cause said pair of opposed jaws of said loading means to grip the bar in said loaded position to prevent movement of the bar from said loaded position in a direction away from said machine tool, and
    g. means to move said sleeve in a direction away from said machine tool to engage said sleeve over the end of the bar nearer said machine tool.

2. The invention of claim 1, wherein said pair of jaws are both mounted on a slide and said slide is reciprocable towards said bar holder from a position at which bar to be loaded can roll from a store of bars into a position of engagement between said jaws and a position at which the bar is located in said loaded position and is gripped by said jaws.

3. The invention of claim 2, wherein said jaws are caused to grip the bar by a stop engaged by one of said jaws, which said one of said jaws leads during movement of said slide towards said bar holder, as said slide moves into said position at which the bar is located in said loaded position.

4. The invention of claim 3, wherein said one of said jaws is pivotably mounted on said slide for pivoting movement about an axis extending parallel to the plane of movement of the bar into said loaded position, to permit said one of said jaws to be released from under the bar upon movement of said slide away from said loaded position, and wherein means are provided to prevent pivotal movement of said one of said jaws during movement of said slide towards said loaded position and means are provided to cause pivotal movement of said one of said jaws as said slide moves into its retracted position to position said one of said jaws for engagement of a further bar between said jaws.

5. The invention of claim 1, wherein said means to engage said sleeve over the end of the bar nearer said machine tool comprise drive means to move the bar towards the machine tool initially to engage the end of the bar nearer the machine tool in the sleeve.

6. The invention of claim 1, wherein
    said feed means to cause axial movement of said sleeve means comprises a slide reciprocable in a direction parallel to the elongated bar holder, a mounting member for said sleeve, guide means for said mounting member and coupling means to couple said mounting member to said slide whereby said mounting member is entrained for movement with said slide,
    said mounting member comprises an inner mounting sleeve securable to said sleeve, an outer mounting sleeve, bearings between said inner mounting sleeve and said outer mounting sleeve to permit rotation, a radially extending projection from said outer mounting sleeve to engage in a longitudinally extending slot in said guide means for said mounting member to prevent rotation of said outer mounting sleeve and a further radially extending projection from said outer mounting sleeve to engage in a groove in said slide, said further radially extending projection and said groove comprising said coupling means.

7. The invention of claim 6, wherein said means to engage said sleeve over the end of the bar nearer said machine tool comprises a further slide including a groove engageable with said further projection of said outer mounting sleeve and means to move said further slide in a direction parallel to said elongated bar holder to locate said sleeve at a position forward of the position at which the forward end of a bar will be located in said loaded position and to move said sleeve back over said forward end of the bar after the bar has been moved by said loading means into said loaded position and while it is still gripped by said jaws of said loading means.

8. The invention of claim 7, further comprising means coupling said means to move said further slide to means to cause reciprocation of said slide of said loading means.

9. the invention of claim 1 wherein
said feed means to cause axial movement of said sleeve means comprises a slide reciprocable in a direction parallel to the elongated bar holder, a mounting member for said sleeve, guide means for said mounting member and coupling means to couple said mounting member to said slide whereby said mounting member is entrained for movement with said slide,
said slide is reciprocable by means of a wire passing over a pulley and attached to a suspended weight and a piston/cylinder arrangement which can be vented to allow said weight to fall and move said slide towards said machine tool and can be pressurized to raise said weight and move said slide away from said machine tool.

10. The invention of claim 1 wherein
said feed means to cause axial movement of said sleeve means comprises a slide reciprocable in a direction parallel to the elongated bar holder, a mounting member for said sleeve, guide means for said mounting member and coupling means to couple said mounting member to said slide whereby said mounting member is entrained for movement with said slide,
said slide is reciprocable by means of a piston/cylinder arrangement.

11. The invention of claim 1, further comprising telescopic guide tubes between said bar feeder and said machine tool.

12. The invention of claim 1, further comprising a sub-collet for said machine tool, such sub-collet having a circular outside configuration and an internal configuration to suit the section of bar to be machined, and a slipping clutch arrangement to cause relative rotation of the bar being fed by said bar feeder and said sub-collet to align the bar with the internal configuration of said sub-collet and permit passage of the bar through said sub-collet.

13. In a bar holder and feeder for an automatic machine tool comprising an elongated bar holder aligned with the machine tool, which bar holder can be opened to allow a bar to be loaded thereinto; loading means to load a bar into a loaded position in the bar holder; and a bar feeder positioned between the elongated bar holder and the machine tool, through an open collet of which machine tool bar is to be fed from the bar holder, the bar feeder comprising:
 a. a sleeve engageable over a bar to be fed at a position externally of the machine tool and feed means to cause axial movement of said sleeve,
 b. said sleeve having internal biased gripping means which permit said sleeve to be moved by said feed means over the bar in a direction away from said machine tool but prevent said sleeve being moved by said feed means over the bar in a direction toward said machine tool whereby a reciprocation of said sleeve by said feed means causes the bar to be fed to said machine tool, and
 c. means to engage said sleeve over the end of the bar nearer said machine tool,
 d. said feed means comprises a slide reciprocable in a direction parallel to the elongated bar holder, a mounting member for said sleeve, guide means for said mounting member and coupling means to couple said mounting member to said sleeve whereby said mounting member is entrained for movement with said slide,
 e. said mounting member comprising an inner mounting sleeve securable to said sleeve, an outer mounting sleeve, bearings between said inner mounting sleeve and said outer mounting sleeve to permit rotation, a radially extending projection from said outer mounting sleeve to engage in a longitudinally extending slot in said guide means for said mounting member to prevent rotation of said outer mounting sleeve and a further radially extending projection from said outer mounting sleeve to engage in a groove in said slide,
 f. said further radially extending projection and said groove constituting said coupling means.

14. the invention of claim 13, wherein
said means to engage said sleeve over the end of the bar nearer said machine tool comprise means to prevent movement of the bar from said loaded position in a direction away from said machine tool and means to move said sleeve in a direction away from said machine tool,
said loading means comprise a pair of opposed jaws, between which jaws the bar can be engaged and means to move said jaws to locate the bar in said loaded position in said bar holder,
said means to prevent movement of the bar comprise means to cause said pair of opposed jaws of said loading means to grip the bar in said loaded position, and
wherein the bar holder and feeder further comprises a bar sensor device for said bar feeder,
said bar sensor device having a further slide including a groove engageable with said further projection of said outer mounting sleeve and means to move said further slide in a direction parallel to said elongated bar holder to locate said sleeve at a position forward of the position at which the forward end of a bar will be located in said loaded position and to move said sleeve back over said forward end of the bar after the bar has been moved by said loading means into said loaded position and while it is still gripped by said jaws of said loading means.

15. The invention of claim 13, further comprising telescopic guide tubes between said bar feeder and said machine tool.

16. The invention of claim 13, further comprising a sub-collet for said machine tool, such sub-collet having a circular outside configuration and an internal configuration to suit the section of bar to be machined, and a slipping clutch arrangement to cause relative rotation of the bar being fed by said bar feeder and said sub-collet to align the bar with the internal configuration of said sub-collet and permit passage of the bar through said sub-collet.

17. In a bar holder and feeder for an automatic machine tool comprising an elongated bar holder aligned with the machine tool, which bar holder can be opened to allow a bar to be loaded thereinto; loading means to load a bar into a loaded position in the bar holder; and a bar feeder positioned between the elongated bar holder and the machine tool, through an open collet of which machine tool bar is to be fed from the bar holder, the bar feeder comprising:
   a. a sleeve engageable over a bar to be fed at a position externally of the machine tool and feed means to cause axial movement of said sleeve,
   b. said sleeve having internal biased gripping means which permit said sleeve to be moved by said feed means over the bar in a direction away from said machine tool but prevent said sleeve being moved by said feed means over the bar in a direction toward said machine tool whereby a reciprocation of said sleeve by said feed means causes the bar to be fed to said machine tool, and
   c. means to engage said sleeve over the end of the bar nearer said machine tool,
   d. said feed means comprises a slide reciprocable in a direction parallel to the elongated bar holder, a mounting member for said sleeve, guide means for said mounting member and coupling means to couple said mounting member to said sleeve whereby said mounting member is entrained for movement with said slide,
   e. said slide being reciprocable by means of a wire passing over a pulley and attached to a suspended weight and a piston/cylinder arrangement can be vented to allow said weight to fall and move said slide toward said machine tool and can be pressurized to raise said weight and move said slide away from said machine tool.

18. In a bar holder and feeder for an automatic machine tool comprising an elongated bar holder aligned with the machine tool, which bar holder can be opened to allow a bar to be loaded thereinto; loading means to load a bar into a loaded position in the bar holder; and a bar feeder positioned between the elongated bar holder and the machine tool, through an open collet of which machine tool bar is to be fed from the bar holder, the bar feeder comprising:
   a. a sleeve engageable over a bar to be fed at a position externally of the machine tool and feed means to cause axial movement of said sleeve,
   b. said sleeve having internal biased gripping means which permit said sleeve to be moved by said feed means over the bar in a direction away from said machine tool but prevent said sleeve being moved by said feed means over the bar in a direction toward said machine tool whereby a reciprocation of said sleeve by said feed means causes the bar to be fed to said machine tool, and
   c. means to engage said sleeve over the end of the bar nearer said machine tool,
   d. said feed means comprises a slide reciprocable in a direction parallel to the elongated bar holder, a mounting member for said sleeve, guide means for said mounting member and coupling means to couple said mounting member to said sleeve whereby said mounting member is entrained for movement with said slide,
   e. said slide being reciprocable by means of a piston/cylinder arrangement.

* * * * *